(12) United States Patent
Ozonat et al.

(10) Patent No.: US 10,579,754 B1
(45) Date of Patent: Mar. 3, 2020

(54) SYSTEMS AND METHODS FOR PERFORMING A FAST SIMULATION

(71) Applicant: Hewlett Packard Enterprise Development LP, Houston, TX (US)

(72) Inventors: Mehmet Kivanc Ozonat, San Jose, CA (US); Ablimit Aji, San Jose, CA (US); Mehmet Oguz Sayal, Sunnyvale, CA (US); Natalia Vasileva, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/132,332

(22) Filed: Sep. 14, 2018

(51) Int. Cl.
*G06F 11/263* (2006.01)
*G01R 31/3183* (2006.01)
*G06F 17/50* (2006.01)
*G01R 31/319* (2006.01)

(52) U.S. Cl.
CPC ..... *G06F 17/5009* (2013.01); *G01R 31/3183* (2013.01); *G06F 11/263* (2013.01); *G01R 31/31917* (2013.01); *G06F 2217/16* (2013.01)

(58) Field of Classification Search
None
See application file for complete search history.

(56) References Cited

U.S. PATENT DOCUMENTS 5,376,962 A * 12/1994 Zortea ............... H04N 9/045
348/222.1
6,810,442 B1 * 10/2004 Lin ..................... G06F 17/5022
703/27
7,590,581 B1 9/2009 Payne et al.
(Continued)

FOREIGN PATENT DOCUMENTS

WO   WO-2017214581 A1   12/2017

OTHER PUBLICATIONS

Tramm J. et al., "Memory Bottlenecks and Memory Contention in Multi-core Monte Carlo Transport Codes," Oct. 27-31, 2013, 9 pages, http://www.mcs.anl.gov/papers/P5056-1213.pdf.
(Continued)

*Primary Examiner* — Kibrom K Gebresilassie
(74) *Attorney, Agent, or Firm* — Sheppard Mullin Richter & Hampton LLP

(57) ABSTRACT

Systems and methods are provided for performing a fast simulation using test parameter vectors as inputs. The method includes retrieving precomputed samples from a sample repository stored in a non-volatile memory, the precomputed samples being precomputed using a simulated model, predetermined parameter vectors, and random inputs; storing respective subsets of the precomputed samples in local memories of a plurality of respective hardware processors; storing the test parameter vectors in the local memories of the hardware processors; at each of the hardware processors, selecting a subset of the precomputed samples stored in the local memory of the hardware processor based on the test parameter vectors, computing test samples by executing the simulated model using the test parameter vectors and the random inputs; and combining the subset of the precomputed samples and the test samples to produce a simulation result.

21 Claims, 9 Drawing Sheets

(56) References Cited

U.S. PATENT DOCUMENTS

| | | | |
|---|---|---|---|
| 8,631,362 B1* | 1/2014 | Mehrotra | G06F 17/5036 |
| | | | 716/110 |
| 2002/0035708 A1* | 3/2002 | Ishida | G01R 31/2882 |
| | | | 714/25 |
| 2003/0125946 A1* | 7/2003 | Hsu | G10L 17/26 |
| | | | 704/246 |
| 2004/0030974 A1* | 2/2004 | Ashar | G01R 31/31707 |
| | | | 714/724 |
| 2005/0004833 A1* | 1/2005 | McRae | G05B 17/02 |
| | | | 703/2 |
| 2007/0288397 A1 | 12/2007 | Frahm et al. | |
| 2010/0332206 A1* | 12/2010 | Leu | G06F 17/5036 |
| | | | 703/14 |
| 2011/0307233 A1* | 12/2011 | Tseng | G06F 17/5022 |
| | | | 703/14 |
| 2012/0330724 A1* | 12/2012 | McCaffrey | G06Q 30/00 |
| | | | 705/7.35 |
| 2013/0144589 A1* | 6/2013 | Levi | G06F 17/5022 |
| | | | 703/14 |
| 2016/0063631 A1 | 3/2016 | Wootton et al. | |
| 2016/0204781 A1* | 7/2016 | Plusquellic | H03K 19/00323 |
| | | | 326/8 |
| 2017/0124494 A1 | 5/2017 | Hristoskov et al. | |
| 2017/0235862 A1* | 8/2017 | Fukuda | G06F 19/00 |
| | | | 703/2 |
| 2018/0129767 A1* | 5/2018 | Akkaraju | G06F 17/5022 |

OTHER PUBLICATIONS

Sascha, D. et al, "Nested MC-based Risk Measurement of Complex Portfolios: Acceleration and Energy Efficiency," 2016, pp. 1-35.

\* cited by examiner

SYSTEMS AND METHODS FOR PERFORMING A FAST SIMULATION

DESCRIPTION OF RELATED ART

Simulations, such as Monte Carlo simulations, may be computed to extrapolate or predict information. Multiple instances or executions of a simulation may be performed, combined, and analyzed to provide increased accuracy. Each instance may involve various values of random inputs to account for variances in the simulation. When combining the results (e.g., by averaging, weighting, etc.), the multiple computations of the simulation may provide more accurate results.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
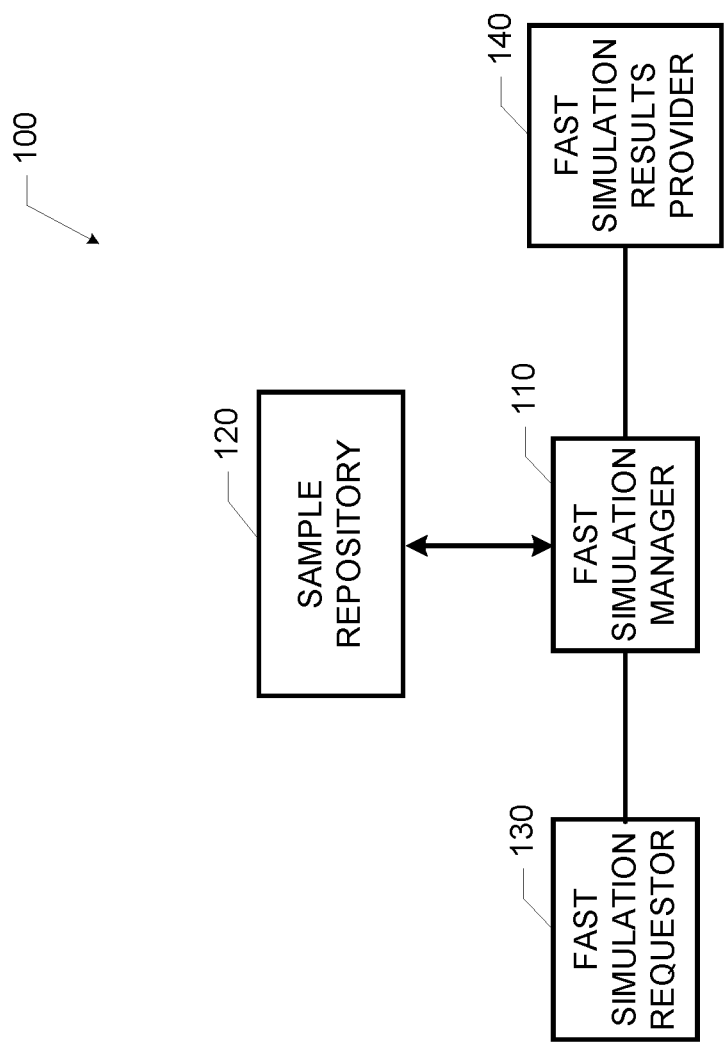
FIG. 1 illustrates a schematic diagram of an example fast simulation system including a fast simulation manager implemented in accordance with an aspect of this disclosure.

The figures are not exhaustive and do not limit the present disclosure to the precise form disclosed.

DETAILED DESCRIPTION

The glossary of terms that follows is provided to assist in understanding this detailed description.

A "parameter vector" is a known input vector θ. A parameter vector may be an input for (i) precomputing samples or (ii) computing samples in real time.

A "predetermined parameter vector" is a parameter vector used as an input for precomputing samples.

A "test parameter vector" is a parameter vector provided by a requestor in a simulation request. A test parameter vector may be used as an input for (i) selecting precomputed samples, and (ii) computing samples in real time.

A "random input" is a random vector X or a seed for producing such a vector. The random input can be an input for (i) precomputing samples or (ii) computing samples in real time.

A "result" is an output of a simulation, whether precomputed or computed in real time. A result includes a plurality of simulation paths.

A "simulation path" is a time series of samples.

A "sample" is a value output by a simulation.

A "sample repository" is a collection of precomputed samples.

Examples disclosed herein involve performing a fast simulation for a test parameter vector of a simulated model (e.g., a model that may be estimated as a simulation that uses a plurality of samples, such as a Monte Carlo simulation) using precomputed simulation results. The precomputed simulation results are computed using predetermined values for parameter vectors of the simulated model and representative sample subsets, and stored in a sample repository. In examples herein, a precomputed sample set is selected from a sample repository based on the test parameter vector, and a fast simulation is performed by using the precomputed sample set. Because results of the simulation are precomputed, a fast simulation manager may retrieve the results from a sample repository. Accordingly, in examples herein, simulations can be performed in real-time by computing the simulation for the test parameter vectors and retrieving pre-computed results from a repository, rather than simulate the test parameter vectors on complete sample sets.

For examples herein, let $$y = f(X, \theta) \quad (1)$$

where y is an output of an example simulated model $f$, X represents inputs (e.g., random inputs) to the simulation, and θ are parameter vectors of the model $f$ relating the inputs to the outputs. As an example, in option pricing, the output y may be the price of a derivative of assets, θ may be a vector of simulation parameter vectors (e.g., implied volatility, mean reversion coefficient, variance of volatility, covariances between assets underlying the derivative, etc.), and X is a vector of random inputs that may affect market behavior (e.g., Brownian motion, etc.).

Further, the output y may be given as a statistical expectation off over the inputs X, as follows:

$$y \approx E(f(\theta, X)) \quad (2)$$

and the expectation is taken over X. When a closed-form solution of the expectation in Equation 2 does not exist (e.g., in some cases for financial derivatives), the expectation may be estimated as follows:

$$g(\theta, X_{\{N\}}) = \frac{1}{N} \sum_{n=1}^{N} f(\theta, X_n) \quad (3)$$

where $X_n$ is a nth randomly selected sample according to a distribution of X, and N is the number of samples for X, and $X_{\{N\}}$ refers to the set of N samples drawn according to the distribution of X. The example model of Equation 3 may be computed as a Monte Carlo simulation. In examples herein, as N approaches infinity, g approaches the statistical expectation given in Equation 2.

An example error $\varepsilon$ of the model of Equation 3 may be given by:

$$\varepsilon = g(\theta, X_{\{N\}}) - E(f(\theta, X)) \quad (4)$$

and the variance of the error $\varepsilon$ may be:

$$E(\varepsilon^2) = E(g(\theta, X_{\{N\}}) - E(f(\theta, X)))^2 = \frac{\sigma^2}{\alpha(N)} \quad (5)$$

where the function $\alpha$ is increasing in N such that the error variance is inversely proportional to the number of samples N. The variance $\sigma^2$ is the variance of the function g. As N increases and/or as the variance of g decreases, the error variance approaches zero.

In the above, it may be computationally expensive (e.g., in derivative pricing simulations) to calculate the function $f$ because the function $f$ may be an output of a path of computations that takes place over a long period of time (e.g., weeks, months, years, etc.). However, following Equation 5, very large values of N (e.g., over one million, over ten million, etc.) may be useful in achieving the most accurate results. Accordingly, it may be difficult to complete the computations in real-time (or online) settings. Examples herein seek to cure these deficiencies and computational issues using a fast simulation approach that uses simulation results that have been precomputed (or were computed offline) using standard, known, or predetermined parameter values and applying those results to test parameter vectors for the fast simulation.

An example method includes receiving a test parameter vector corresponding to a parameter set of simulation and selecting a precomputed sample set from sample repository of the simulation. In examples herein, sample subsets are based on simulations using predetermined simulation parameter values. Further, example methods include determining a result of the simulation of the simulated model for the test parameter vector using the precomputed sample set. Accordingly, such a method allows for a fast simulation for the test parameter vector without simulating the test parameter vectors across complete sample sets.

As used herein, a fast simulation refers to an example simulation of a simulated model performed herein using selected results of precomputed simulations of the simulated model to estimate results for test parameter vectors. The precomputed simulations may be simulations using known, predetermined, expected values for parameter vectors of a simulated model.

FIG. 1 is a schematic diagram of an example fast simulation system 100 including a fast simulation manager 110 constructed in accordance with examples herein. The example fast simulation system 100 of FIG. 1 includes the fast simulation manager 110, a sample repository 120, a fast simulation requestor 130, and a fast simulation results provider 140. In examples herein, the simulation manager 110 handles simulation requests from the simulation requestor 130 and utilizes results from the sample repository 120 to perform a fast simulation and provide results of the fast simulation via the simulation results provider 140. For example, the fast simulation manager 110 may reformulate Equation 3 in the following manner:

$$g(\theta, X_{\{N\}}) = \sum_{k=1}^{K} \alpha_k (g(\theta_k, X_{\{N\}}) + h(\theta, \theta_k, X_{\{M\}})) \quad (6)$$

where $$h(\theta, \theta_k, X_{\{M\}}) = g(\theta, X_{\{M\}}) - g(\theta_k, X_{\{N\}}) \quad (7)$$

and where k is a predetermined parameter vector index, $\alpha_k$ is a weight for a precomputed parameter set k. In examples herein, the fast simulation manager 110 may select the M samples from N samples to be included in the sample repository 120. For example, the fast simulation manager 110 may select the M samples from N based on a statistical distribution of N using a distance analysis (e.g., a Kolmogorov-Smirnov distance analysis). The example N samples may be received/retrieved from a database (e.g., a database separate from the sample repository 120), from the fast simulation requestor 130, or from any other entity or device. The fast simulation manager 110 may then analyze the N samples and select the M samples for storage in the sample repository 120.

In examples herein, M is much smaller (e.g., multiple orders of magnitude, e.g., $\frac{1}{100}^{th}$, $\frac{1}{1000}^{th}$, $\frac{1}{10,000}^{th}$, etc.) than N (i.e., M<<N). From Equations 6 and 7, $g(\theta_k, X_{\{N\}})$, $g(\theta_k, X_{\{M\}})$, and $X_{\{M\}}$ may be precomputed (e.g., by the fast simulation manager 110 or other simulator) and stored in the sample repository 120, such that when a test parameter vector $\theta$ is received from the simulation requestor 130, the fast simulation manager 110 may retrieve the values and calculate $g(\theta, X_{\{N\}})$ to determine results of a simulation for the test parameter vector $\theta$. An example implementation of the fast simulation manager 110 is discussed below in connection with FIG. 2.

The example sample repository 120 includes M samples selected from precomputed simulations on complete sets of N samples (e.g., simulations of $g(\theta_k, X_{\{N\}})$) of a simulated model. In examples herein, the sample repository 120 may include multiple subsets of M samples for use in performing a fast simulation in accordance with examples herein. For the sake of readability and examples herein, the sample repository 120 may be referred to as storing a single sample set of M samples or multiple sample sets of M samples each for use in a fast simulation.

The sample repository 120 of FIG. 1 includes results of precomputed simulations on complete sets of N samples (e.g., simulations of $g(\theta_k, X_{\{N\}})$) of a simulated model, subsets of samples (inputs of the simulations), and a predetermined parameter set of the simulated model. In some examples, the sample repository 120 may hold subsets of samples (e.g., subsets of M samples from the above) and results for multiple types or sets of simulations. For the sake of examples, herein, the sample repository 120 is considered to hold M preselected results/samples from precomputed N samples of a simulated model (e.g., a Monte Carlo simulation) for analysis/use by the fast simulation manager 110. The sample repository 120 may include the M results (e.g., outputs) of the precomputed simulations along with parameter values, inputs, etc. The results of the precomputed simulations correspond to results of a simulated model executed multiple times with various values for parameter vectors (e.g., $\theta_k$) of the simulation. In some examples, the fast simulation manager 110 may generate the results of the precomputed simulations stored in the sample repository 120 by precomputing the simulations of the simulated model (e.g., prior to going "online," prior to receiving a request from the simulation requestor 130, etc.). The results/samples in the sample repository 120 are considered precomputed in that they are determined prior to the fast simulation manager 110 performing a fast simulation of the simulated model for a set of test parameter vectors.

In some examples, the sample repository 120 may store results of the simulation of $g(\theta_k, X_{\{N\}})$, results of the simulation of $g(\theta_k, X_{\{M\}})$ and sample subsets $X_{\{M\}}$ for large numbers (e.g., one hundred, one thousand, etc.) of different values of $\theta_k$. As such, due to the magnitude of K and M, a large shared memory structure may be used to implement the sample repository 120. For example, the sample repository 120 and/or any other storage device storing samples (e.g., a database storing the M samples) may be implemented by a cluster of memory devices. In some examples, the sample repository 120 may be implemented by a persistent, byte-addressable memory that includes a memory fabric. Accordingly, such memory implementations may allow simulations for large values of N (e.g., over one million samples, over ten million samples, etc.).

In examples herein, a Monte Carlo simulation, such as from Equation 3, may become the following optimization problem to select and use the M samples from the sample repository 120:

$$\min E((\Sigma_k \alpha_k (g(\theta_k, X_{\{N\}}) + g(\theta, X_{\{M\}}) - g(\theta_k, X_{\{M\}}))) - E(f(\theta, X)))^2 \quad (8)$$

such that the memory space of the sample repository 120 allocated for the fast simulation is greater than or equal to the memory space to store number of samples selected (M) by the number of parameter sets to be tested (K) (i.e., M×K<Allocated Memory). "One can use rate-distortion theory with side information to select the samples to be stored in the sample repository given the memory constraint of the repository, i.e., the amount of memory available to the repository. In paragraphs 106 through 115, this approach is given in detail. In paragraphs 122 through 132, an example of this for the case of pricing a financial derivative product is provided. In paragraphs 116 through 121, this selection process is incorporated into the larger algorithm."

The example values of the parameter set $\theta_k$ of each execution of the simulation (used to determine the simulation results for both the complete set of samples (N) and for subset of samples (M) in the sample repository 120) are predetermined. For example, the parameter vectors $\theta_k$ may be random, uniform, expected, or common values for a simulated model in a given simulation, such as the simulation of Equations 6 and 7. The sample repository 120 may be structured such that it can be referenced for use when receiving test parameter vector for $\theta$ from the fast simulation requestor 130. As such, the sample repository 120 may implement a data structure (e.g., an index, table, etc.) to identify corresponding precomputed results of the simulation based on a set of test parameter values received from the fast simulation requestor 130. For example, the data structure of the sample repository 120 may enable the fast simulation manager 110 to retrieve simulation results having certain values for $\theta_k$ based on received test parameter vectors for $\theta$ for Equations 6 and 7.

Furthermore, in some examples, the example sample repository 120 may be in communication with the fast simulation manager 110 via a network. Accordingly, the sample repository 120 may be located or simulated within a cloud system (e.g., a network of servers and/or other computing devices) in communication with the fast simulation manager 110. In such examples, a device implementing the fast simulation manager 110 may not store the precomputed results of the sample repository 120 and the precomputed results may be determined offline.

The example fast simulation requestor 130 requests the fast simulation manager 110 to perform a fast simulation for a set of test values for parameter vector (e.g., a parameter vector $\theta$ of the above simulation) of a simulation. For example, the fast simulation requestor 130 may send a request message that indicates a test simulation for a simulated model (e.g., $g(\theta, X)$), test parameter vector for parameter vector of the simulated model (e.g., for the parameter vector $\theta$ above), etc. The fast simulation manager 110 may then facilitate a fast simulation of the simulated model for the test parameter vector in accordance with examples herein. The fast simulation requestor 130 may be implemented by a user interface that enables a user to send the request. In some examples, the request may be sent or provided automatically (e.g., in response to characteristics or a subject of the simulated model, such as a market or changes to a market).

The fast simulation manager 110, described in more detail in connection with FIG. 2, performs a fast simulation using test parameter vector (e.g., for the parameter vector $\theta$) requested by the fast simulation requestor 130. The fast simulation manager 110 may then forward results of the fast simulation to the fast simulation results provider 140. The example fast simulation results provider 140 may present (e.g., via a display device) or provide results of the fast simulation. In some examples the fast simulation results provider 140 may return or provide the results of the fast simulation to the fast simulation requestor 130. The fast simulation results provider 140 may include or be implemented by a user interface (e.g., a display, a speaker, etc.) that provides the results of the fast simulation performed by the fast simulation manager 110.

Figure 2:
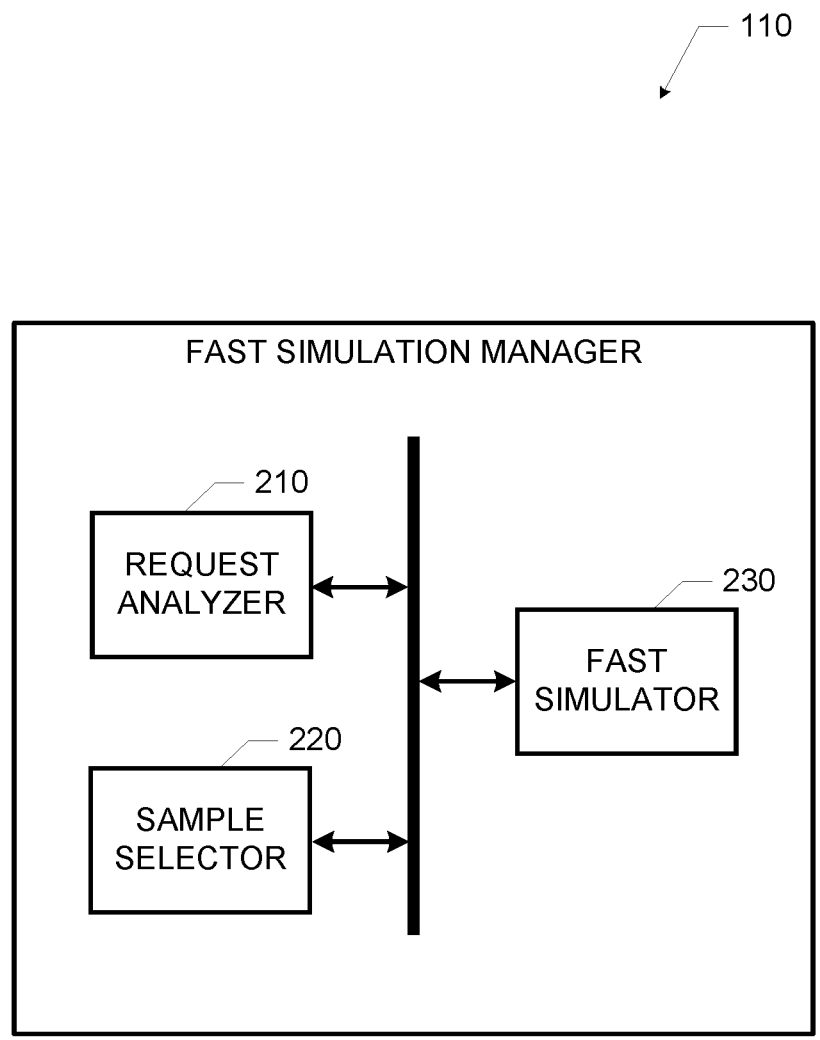
FIG. 2 a block diagram of an example fast simulation manager that that may be used to implement the fast simulation manager of FIG. 1.

FIG. 2 is a block diagram of an example implementation of a fast simulation manager 110 that may be used to implement the fast simulation manager 110 of FIG. 1. The fast simulation manager 110 of FIG. 2 includes a request analyzer 210, a sample selector 220, and a fast simulator 230. In examples herein, the request analyzer 210 analyzes requests from the fast simulation requestor 130 to determine a test parameter vector (e.g., values for $\theta$ in Equations 6 and 7) for a fast simulation of a simulated model, the sample selector 220 selects sample subsets for storage in the sample repository 120 and relevant precomputed sample sets from the sample repository 120, and the fast simulator 230 executes (e.g., computes) a fast simulation for the test parameter vectors based on the results corresponding to the precomputed sample set selected by the sample selector 220.

The example request analyzer 210 receives fast simulation requests from the fast simulation requestor 130 of FIG. 1. The example fast simulation request may include a simulated model and test parameter vector(s) corresponding to parameter(s) (e.g., the parameter vectors $\theta$ of Equations 6 and 7) of the simulated model for which the fast simulation manager 110 of FIG. 2 is to perform a fast simulation. The example request analyzer 210 may analyze the request and identify test parameter information (e.g., test parameter identifier(s), test parameter vector(s), etc.). The request analyzer 210 may provide the test parameter information to the sample selector 220.

In examples, herein, the sample selector 220 preselects the M samples for fast simulation of a simulated model for storage in the sample repository 120 prior to receiving the fast simulation request from the fast simulation requestor 130. For example, the sample selector 220 may use the optimization analysis of Equation 8 to select the sample subset $X_{\{M\}}$. More specifically, the sample selector 220 may perform a distance analysis, such as a Kolmogorov-Smirnov distance analysis, to select a subset of M samples from a set of N samples. For example, the sample selector 220 may perform the following analysis:

$$X_{\{M\}} = \arg\min d_{KS}(X_{\{N\}}, Y_{\{M\}})) \quad (9)$$

where X and Y are drawn from a same statistical distribution, with the statistical expectation being taken over values of the test parameter vector θ. The expectation of Equation 9 may be minimized over the sets of $\alpha_k$ and $\theta_k$ and $d_{KS}$ denotes the Kolmogorov-Smirnov distance.

In examples herein, the sample selector 220 weights the selected subsets of samples corresponding to parameter sets $\theta_k$ using $\alpha_k$ based on a metric distance between $\theta_k$ and the test parameter vector θ. For example, $\alpha_k$ may equal 1 ($\alpha_k=1$) when a $\theta_k$ values are near the value of the test parameter vector θ, $\alpha_k$ may equal 0 ($\alpha_k=0$) or nearer to zero when $\theta_k$ values are far from the value of the test parameter vector θ. In examples herein, minimizing a distance between the $\theta_k$ values of the samples and the test parameter vectors θ, allows the distribution of the sample set $X_{\{M\}}$ as close to $X_{\{N\}}$ as possible, and as such, the M samples in the analysis may act (or appear) as though there are N samples (i.e., the denominator in Equation 5 is close to α(N)).

The example sample selector 220 selects a precomputed sample set from the sample repository 120 based on the values of the test parameter vector received in the fast simulation request. For example, the sample selector 220 may select sample subsets from the sample repository 120 that used similar values (e.g., for $\theta_k$) for the corresponding parameter vectors of the simulation as the value(s) of the test parameter vector(s) (e.g., the θ of Equations 6 and 7). The example sample selector 220 may use a distance analysis in selecting the precomputed sample set from the sample repository 120. For example, the sample selector 220 may select the test samples that are nearest in value to the test parameter vector.

Further, based on the distance analysis between the test parameter vector and the parameter sets corresponding to the sample subsets in the sample repository 120, the set selector 220 may select one or more sample subsets to form the precomputed sample set. For example, the sample subsets may be selected based on a top threshold number (e.g., top one thousand, one hundred, etc. based on the distance calculation), a threshold distance (e.g., all parameter sets that fall within a distance of the test parameter based on the distance analysis), or any other suitable threshold determination using the distance analysis. Accordingly, using the values of the test parameter vector, the sample selector 220 determines a precomputed sample set from the sample repository 120 for use in executing a fast simulation of the simulation using the test parameter vectors.

The sample selector 220 provides the precomputed sample set to the fast simulator 230. The example fast simulator 230 computes the simulation (e.g., the simulation $g(\theta, X_{\{N\}})$ from Equation 6) using the parameter sets $\theta_k$ corresponding to the sample subsets selected from the repository and the test parameter vector θ. For example for test parameter vector θ, the fast simulator 230 may perform a fast simulation to compute $g(\theta, X_{00})$ from Equation 6, where $g(\theta_k, X_{\{N\}})$ and $g(\theta_k, X_{\{M\}})$ (from Equation 7) are retrieved from the sample repository 120. For example, the fast simulator 230 may determine a difference between a simulation using the test parameter vector (i.e., $g(\theta, X_{\{M\}})$) and a simulation using the predetermined values for the parameter vectors (i.e., $g(\theta_k, X_{\{M\}})$), which can be retrieved from the sample repository 120. Then, using known computed results for the simulation for the predetermined values across the set of N samples (i.e., $g(\theta_k, X_{\{N\}})$), which can be retrieved from the sample repository 120, the fast simulator 230 can compute $g(\theta, X_{\{N\}})$. Accordingly, because $\theta_k$ and $X_{\{N\}}$ (and thus $X_{\{M\}}$) are precomputed, the fast simulator 230 may simply retrieve the results from the sample repository 120 and compute $g(\theta, X_{\{M\}})$ in real-time. As such, rather than computing N simulations to get $g(\theta, X_{\{N\}})$ for test parameter vector θ, the fast simulator 230 computes $g(\theta, X_{\{M\}})$ in real-time for the test parameter vector θ and extrapolates these results to the entire sample set N using the precomputed values for $(\theta_k, X_{\{N\}})$ and $g(\theta_k, X_{\{M\}})$ from the sample repository 120. Accordingly, using the precomputed results, the fast simulator 230 may determine $g(\theta, X_{\{N\}})$ from Equation 6 for the test parameter vector θ using a much smaller sample set M.

In some examples, the fast simulation manager 110 may utilize a Taylor series expansion for approximation. In some examples, when X from the simulated models above is one-dimensional and $f$ can be evaluated at equally distant points $U_k$, a real line can be divided into segments k, where each segment is centered around $U_k$. Then, for a given X within a segment j, $$\alpha_k = \begin{cases} 1, & k = j \\ 0, & k \neq j \end{cases} \quad (10)$$

and $$g(\theta_k, X) = f(U_k)$$

and $$h(\theta, \theta_k, X) = \sum_i f^i(U_k) \frac{(X - U_k)^j}{\text{factorial}(i)} \quad (12)$$

such that Equation 12 represents an order of terms of a Taylor expansion of $f(X)$ around $U_j$.

While an example manner of implementing the fast simulation manager 110 of FIG. 1 is illustrated in FIG. 2, at least one of the elements, processes and/or devices illustrated in FIG. 2 may be combined, divided, re-arranged, omitted, eliminated and/or implemented in any other way. Further, the request analyzer 210, the sample selector 220, the fast simulator 230 and/or, more generally, the example fast simulation manager 110 of FIG. 2 may be implemented by hardware and/or any combination of hardware and executable instructions (e.g., software and/or firmware). Thus, for example, any of request analyzer 210, the sample selector 220, the fast simulator 230 and/or, more generally, the example fast simulation manager 110 could be implemented by at least one of an analog or digital circuit, a logic circuit, a programmable processor, an application specific integrated circuit (ASIC), a programmable logic device (PLD) and/or a field programmable logic device (FPLD).

When reading any of the apparatus or system claims of this patent to cover a purely software and/or firmware implementation, at least one of request analyzer 210, the sample selector 220, and/or the fast simulator 230 is/are hereby expressly defined to include a tangible machine readable storage device or storage disk such as a memory, a digital versatile disk (DVD), a compact disk (CD), a Blu-ray disk, etc. storing the executable instructions. Further still, the example fast simulation manager 110 of FIG. 2 may include at least one element, process, and/or device in addition to, or instead of, those illustrated in FIG. 2, and/or may include more than one of any or all of the illustrated elements, processes and devices.

Figure 3:
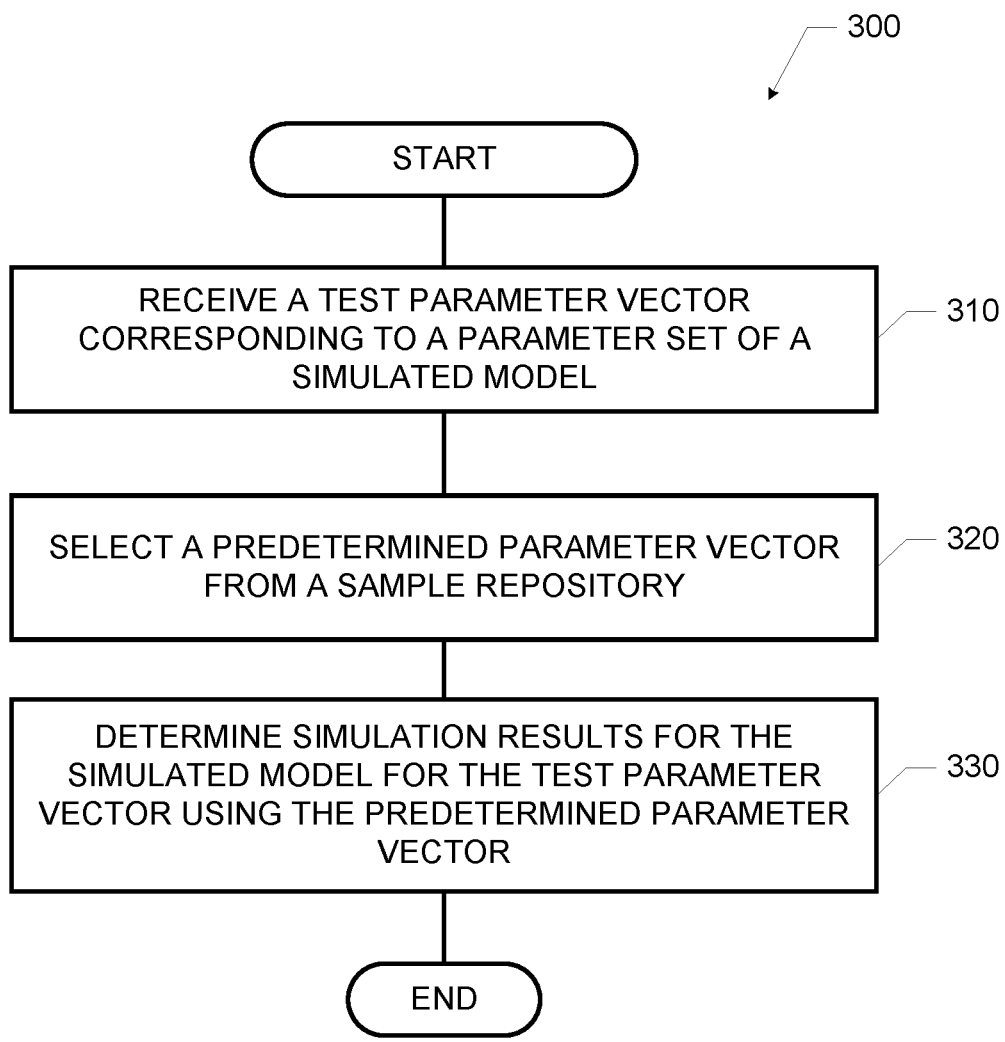
FIG. 3 is a flowchart representative of example machine readable instructions that may be executed to implement the fast simulation manager of FIG. 2.

A flowchart representative of example machine readable instructions for implementing the fast simulation manager 110 of FIG. 2 is shown in FIG. 3. In this example, the machine readable instructions comprise a program/process for execution by a processor such as the processor 412 shown in the example processor platform 400 discussed below in connection with FIG. 4. The program/process may be embodied in executable instructions (e.g., software) stored on a tangible machine readable storage medium such as a CD-ROM, a floppy disk, a hard drive, a digital versatile disk (DVD), a Blu-ray disk, or a memory associated with the processor 412, but the entire program/process and/or parts thereof could alternatively be executed by a device other than the processor 412 and/or embodied in firmware or dedicated hardware. Further, although the example program is described with reference to the flowchart illustrated in FIG. 3, many other methods of implementing the example fast simulation manager 110 may alternatively be used. For example, the order of execution of the blocks may be changed, and/or some of the blocks described may be changed, eliminated, or combined.

The example process 300 of FIG. 3 begins with an initiation of the fast simulation manager 110 (e.g., upon startup, upon instructions from a user, upon startup of a device implementing the fast simulation manager 110 (e.g., the fast simulation system 100), etc.). The example process of FIG. 3 may be executed to perform a fast simulation for test parameter vectors (e.g., for the test parameter vector $\theta$) using pre-computed results of a simulation. In the illustrated example, at block 310, the request analyzer 210 receives a test parameter vector corresponding to a parameter set of a simulated model. For example, at block 310, the request analyzer 210 may receive a request comprising simulation and/or parameter information (e.g., values for the parameter vectors of the parameter set $\theta$) for use in a fast simulation. The example request analyzer 210 may analyze, parse, etc. the message to identify the test parameter vector for the fast simulation.

At block 320 of FIG. 3, the sample selector 220 selects a precomputed sample set from the sample repository 120. For example, the sample selector 220 may select samples from the sample repository 120 based on the predetermined simulation parameter values (e.g., for $\theta_k$). For example, at block 320, the sample selector 220 may perform a distance analysis between the values for the test parameter vector $\theta$ and the $\theta_k$. In some examples, at block 320, the sample selector 220 may apply a weight (e.g., $\alpha_k$) to each sample subset.

At block 330 of FIG. 3, the example fast simulator 230 determines results of the simulation for the simulated model for the test parameter vector using the precomputed sample set. For example, at block 330, the fast simulator 230 may compute a simulation (e.g., Equations 6 and 7) using the pre-computed results (e.g., $g(\theta_k,X_{\{N\}})$ and $g(\theta_k,X_{\{M\}})$) and perform a real-time simulation for the test parameter vector values using the selected samples (e.g., $X_{\{M\}}$). For example, the fast simulator 230 may apply the test parameter vector $\theta$ to the precomputed sample set to obtain $g(\theta,X_{\{M\}})$. Accordingly, at block 330, the fast simulator 230 may perform a real-time simulation for the test parameter vector on a selected subset of cardinality (M) rather than performing a real-time calculation for the test parameter vectors using the entire sample set of cardinality (N). As such, at block 330, the fast simulator 230 may determine a difference between a simulation using the test parameter vector (i.e., $g(\theta,X_{\{M\}})$) and a simulation using the predetermined values for the parameter vectors (i.e., $g(\theta_k,X_{\{M\}})$). Then, using known computed results for the simulation for the predetermined values across the set of N samples (i.e., $g(\theta_k,X_{\{N\}})$), the fast simulator 230 can compute $g(\theta,X_{\{N\}})$. After block 330, the example process 300 ends. In some examples, after block 330, the results of the fast simulation may be provided (e.g., transmitted, displayed, etc.) to a user or other device (e.g., via the results provider 140).

As mentioned above, the example processes of FIG. 3 may be implemented using coded instructions (e.g., computer and/or machine readable instructions) stored on a tangible machine readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible machine readable storage medium is expressly defined to include any type of machine readable storage device and/or storage disk and to exclude propagating signals and to exclude transmission media. As used herein, "computer readable storage medium" and "machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory machine readable medium is expressly defined to include any type of machine readable storage device and/or storage disk and to exclude propagating signals and to exclude transmission media.

As used herein, when the phrase "at least" is used as the transition term in a preamble of a claim, it is open-ended in the same manner as the term "comprising" is open ended. As used herein the term "a" or "an" may mean "at least one," and therefore, "a" or "an" do not necessarily limit a particular element to a single element when used to describe the element. As used herein, when the term "or" is used in a series, it is not, unless otherwise indicated, considered an "exclusive or."

Figure 4:
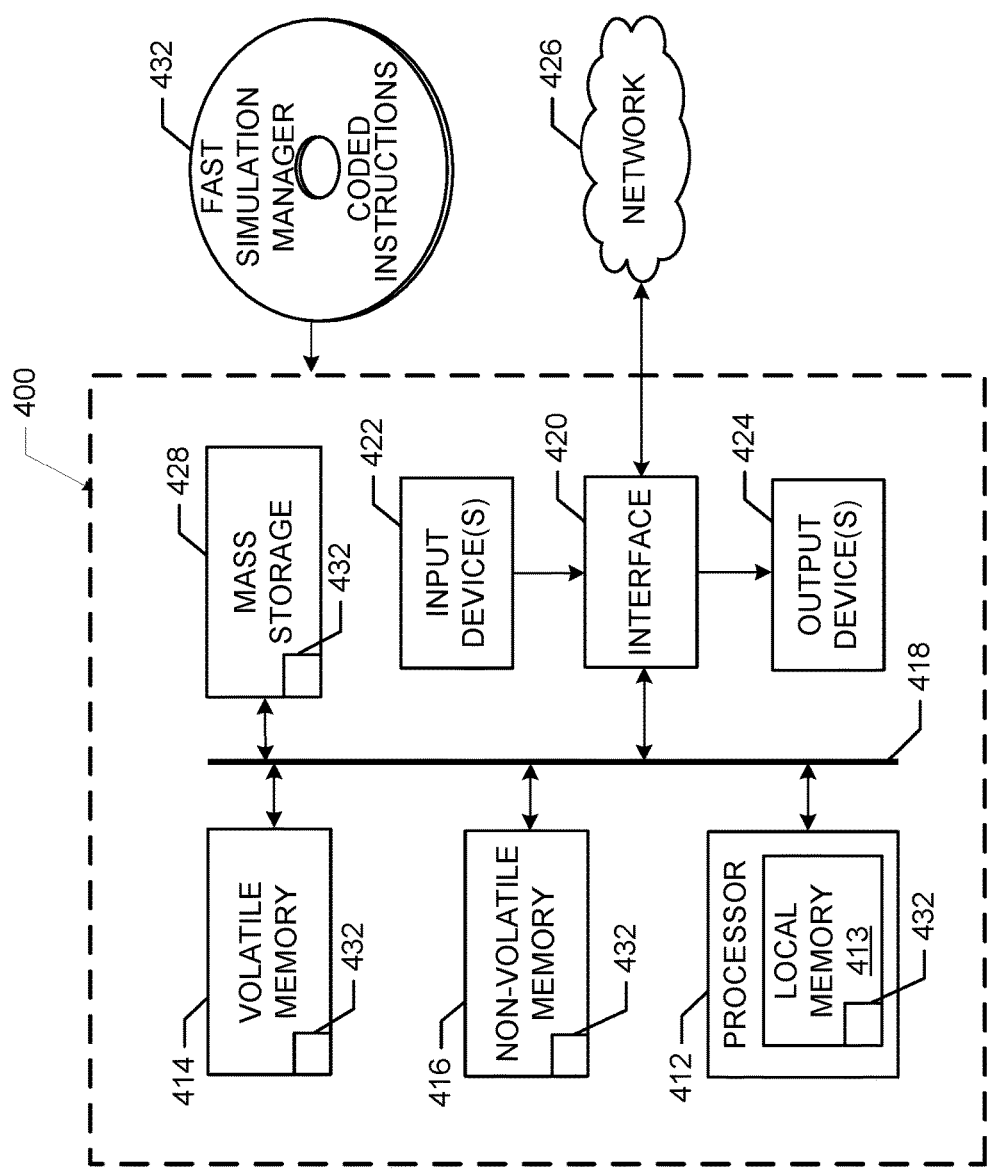
FIG. 4 is a block diagram of an example processor platform capable of executing the instructions of FIG. 3 to implement the fast simulation manager of FIG. 2.

FIG. 4 is a block diagram of an example processor platform 400 capable of executing the instructions of FIG. 3 to implement the fast simulation manager 110 of FIG. 2. The example processor platform 400 may be or may be included in any type of apparatus, such as a server, a personal computer, a mobile device (e.g., a cell phone, a smart phone, a tablet, etc.), a personal digital assistant (PDA), an Internet appliance, a DVD player, a CD player, a digital video recorder, a Blu-ray player, a gaming console, a personal video recorder, a set top box, or any other type of computing device.

The processor platform 400 of the illustrated example of FIG. 4 includes a processor 412. The processor 412 of the illustrated example is hardware. For example, the processor 412 can be implemented by at least one integrated circuit, logic circuit, microprocessor or controller from any desired family or manufacturer.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), and/or a peripheral component interconnect (PCI) express interface.

In the illustrated example, at least one input device 422 is connected to the interface circuit 420. The input device(s) 422 permit(s) a user to enter data and commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

At least one output device 424 is also connected to the interface circuit 420 of the illustrated example. The output device(s) 424 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 420 of the illustrated example, thus, may include a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes at least one mass storage device 428 for storing executable instructions (e.g., software) and/or data. Examples of such mass storage device(s) 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the local memory 413 in the volatile memory 414, in the non-volatile memory 416, and/or on a removable tangible machine readable storage medium such as a CD or DVD.

From the foregoing, it will be appreciated that the above disclosed methods, apparatus and articles of manufacture provide for a simulation (i.e., a fast simulation) of a simulated model for a test parameter vector using precomputed results of simulations of the simulated model. In examples herein, fast simulation may be performed that increases the speed of computing a simulation by using precomputed simulation results. In examples herein, a sample set is selected to represent a full set of samples for computing a simulation (e.g., a Monte Carlo simulation). By applying the test parameter vector to the sample set and determining a difference between the sample set with the test parameter vectors and the sample set with predetermined parameter values, the simulation can be computed for the test parameter vector with greatly increased speed. For example, for a total of N samples, and M subsamples selected from the N samples where M<<N (e.g., at least one thousand times smaller), the speed of computing the simulation across N samples using the selected M subsamples can increase by N/M.

Figure 5:
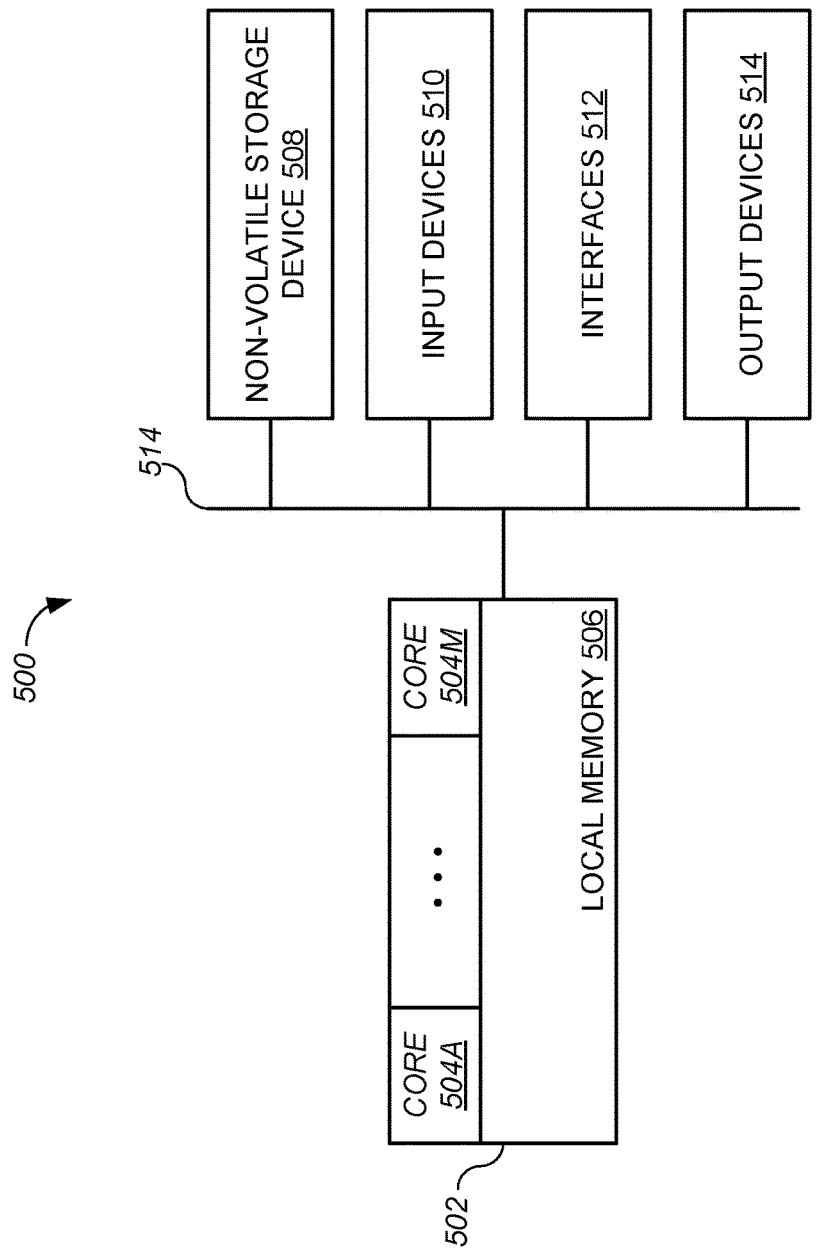
FIG. 5 shows a conventional simulation system.

Now a conventional simulation system is compared to a simulation system according to some embodiments. A conventional simulation system 500 is shown in FIG. 5. System 500 includes a single processor 502 connected by one or more busses 514 to a non-volatile storage device 508, one or more input devices 510, one or more communication interfaces 512, and one or more output devices 514. Processor 502 may include m cores 504a through 504m and a local memory 506.

Figure 6:
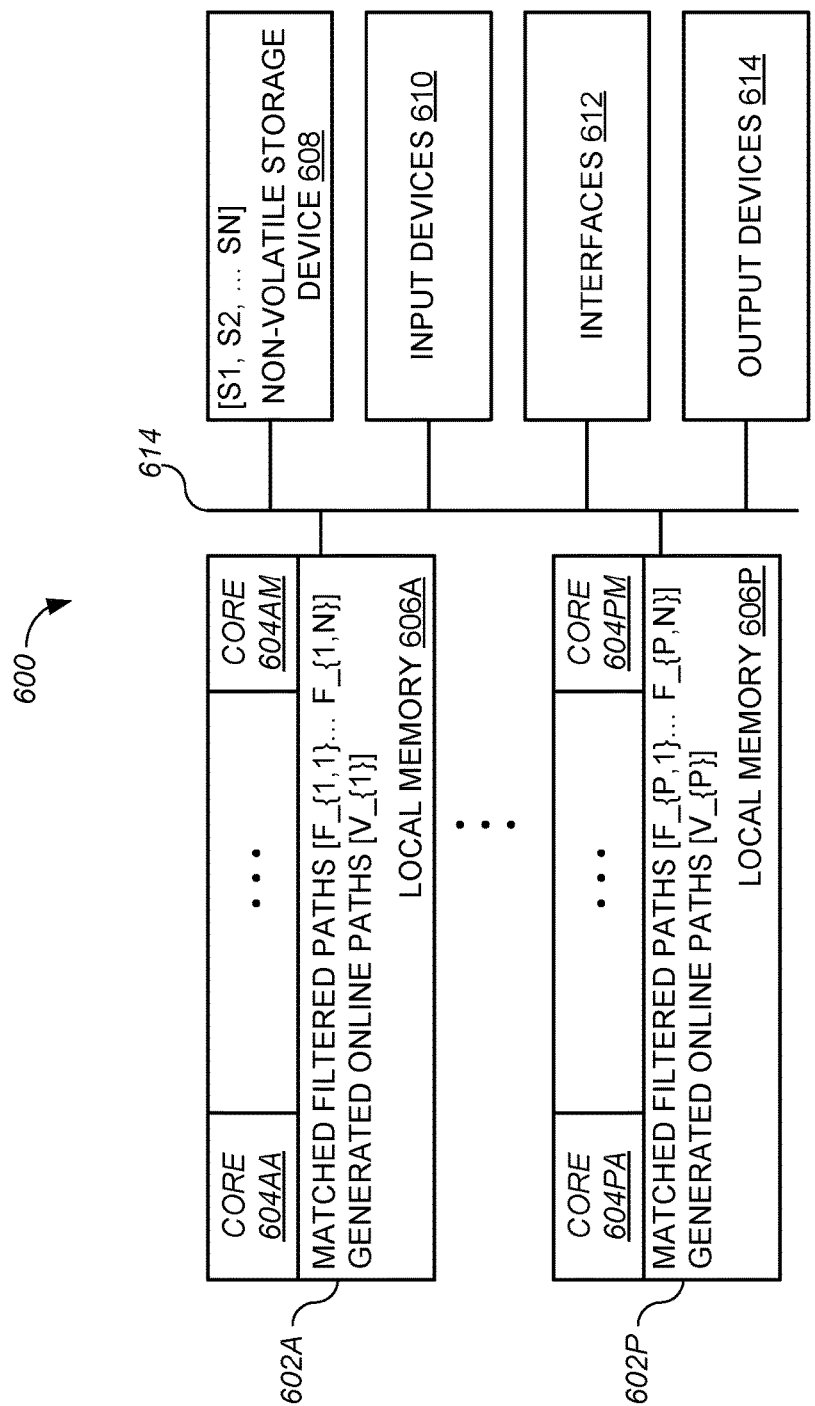
FIG. 6 shows a simulation system according to some embodiments.

In contrast, FIG. 6 shows a simulation system 600 according to some embodiments. System 600 includes p processors 602a through 602p connected by one or more busses 614 to a non-volatile storage device 608, one or more input devices 610, one or more communication interfaces 612, and one or more output devices 614. Each processor 602 includes m cores 604a through 604m and a local memory 606. This storage architecture is possible due to the large local memory size of the system 600, large total memory size of the system 600, the shared memory architecture of the system 600, and the low latency to non-local shared memory in the system 600. The system 600 may be implemented as a Hewlett Packard Enterprise (HPE) SuperDome server. One implementation executes on a HPE SuperDome Flex server configured with 1152 cores and 48 TB of memory.

Figure 7A:
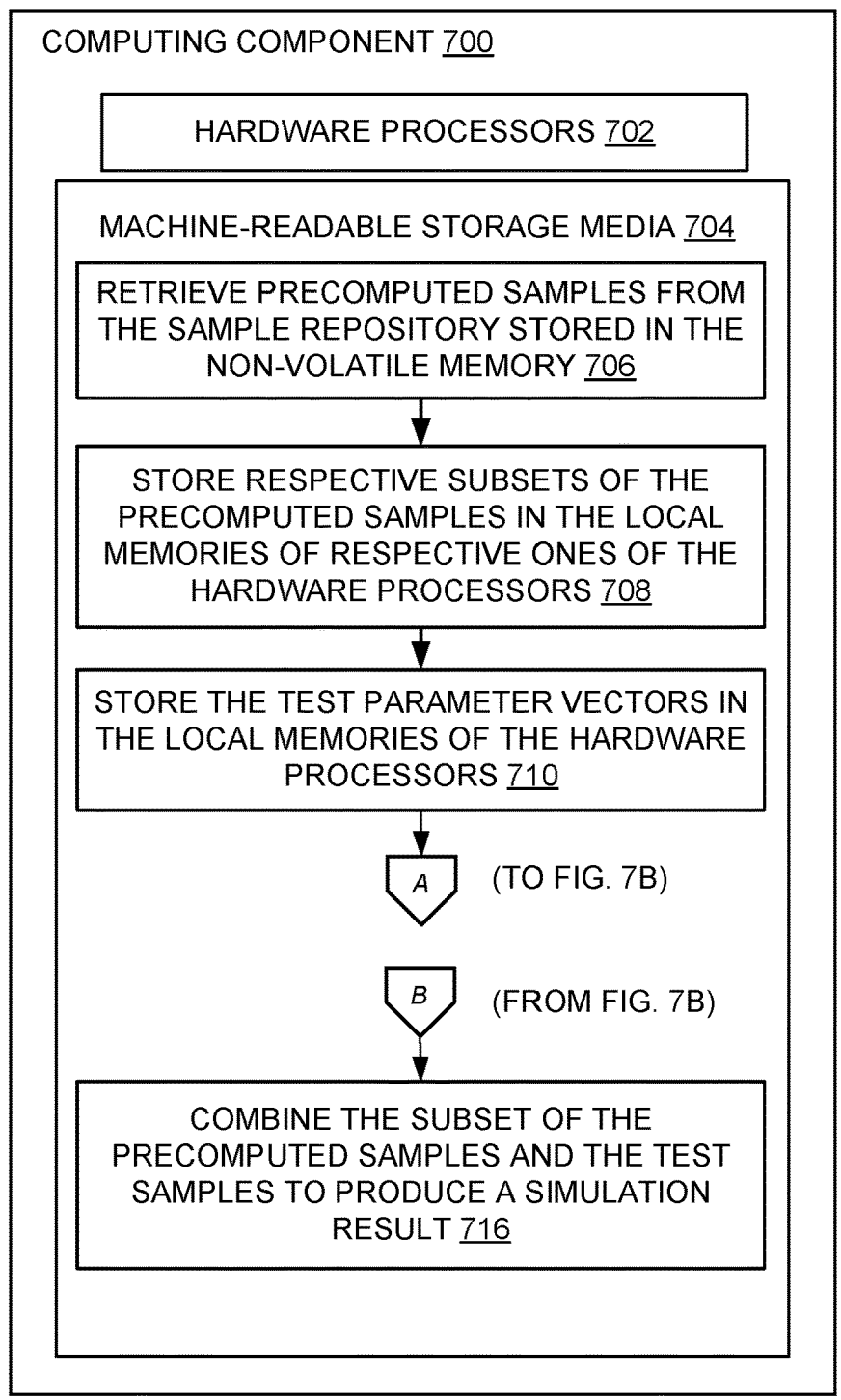
FIG. 7a is a block diagram of an example computing component for performing first and third phases of a fast simulation using test parameter vectors as inputs according to one embodiment.

FIG. 7A is a block diagram of an example computing component 700 for performing first and third phases of a fast simulation using test parameter vectors as inputs according to one embodiment. The fast simulation may represent a Monte Carlo simulation. The first and third phases are performed collectively for all of the hardware processors 602, while the second phase is performed by each hardware processor 602 independently, as described below with reference to FIG. 7B. Computing component 700 includes multiple hardware processors 702 and multiple machine readable storage media 704, as depicted in FIG. 7A, and may be implemented as described above regarding FIG. 6.

Hardware processors 702 may execute instruction 706 to retrieve precomputed samples from the sample repository stored in the non-volatile memory 616. The precomputed samples are computed using a simulated model, predetermined parameter vectors, and random inputs prior to receiving the test parameter vectors, as described above. The size of the sample repository 616 corresponds to the capacity of the local memories 606.

Hardware processors 702 may execute instruction 708 to store respective subsets of the precomputed samples in the local memories 606 of respective ones of the hardware processors 702. To reduce the memory-read latency times during the online simulation, the data is stored taking into account memory locality and cache size characteristics. Each precomputed sample belongs to one of N simulation paths, shown in FIG. 6 as [s1, s2, ... sN]. The subsets of precomputed samples are obtained through a filtering operation, and are denoted by [f{p,1}, f{p,2}, ... , f{p,N}] for processor p in FIG. 6.

In some embodiments, each of the respective subsets of the precomputed samples comprises a respective group of simulation paths. In some embodiments, these subsets are allocated according to the random inputs used to generate the precomputed samples. Each simulation path is the simulation result of a particular predetermined parameter vector and a particular random input vector. So for i random input vectors and m local memories, the first local memory may store the samples for the first i/m simulation paths, the second local memory may store the samples for the second i/m simulation paths, and so on. Hardware processors 702 may execute instruction 710 to store the test parameter vectors in the local memories 606 of the hardware processors 602 as well.

Figure 7B:
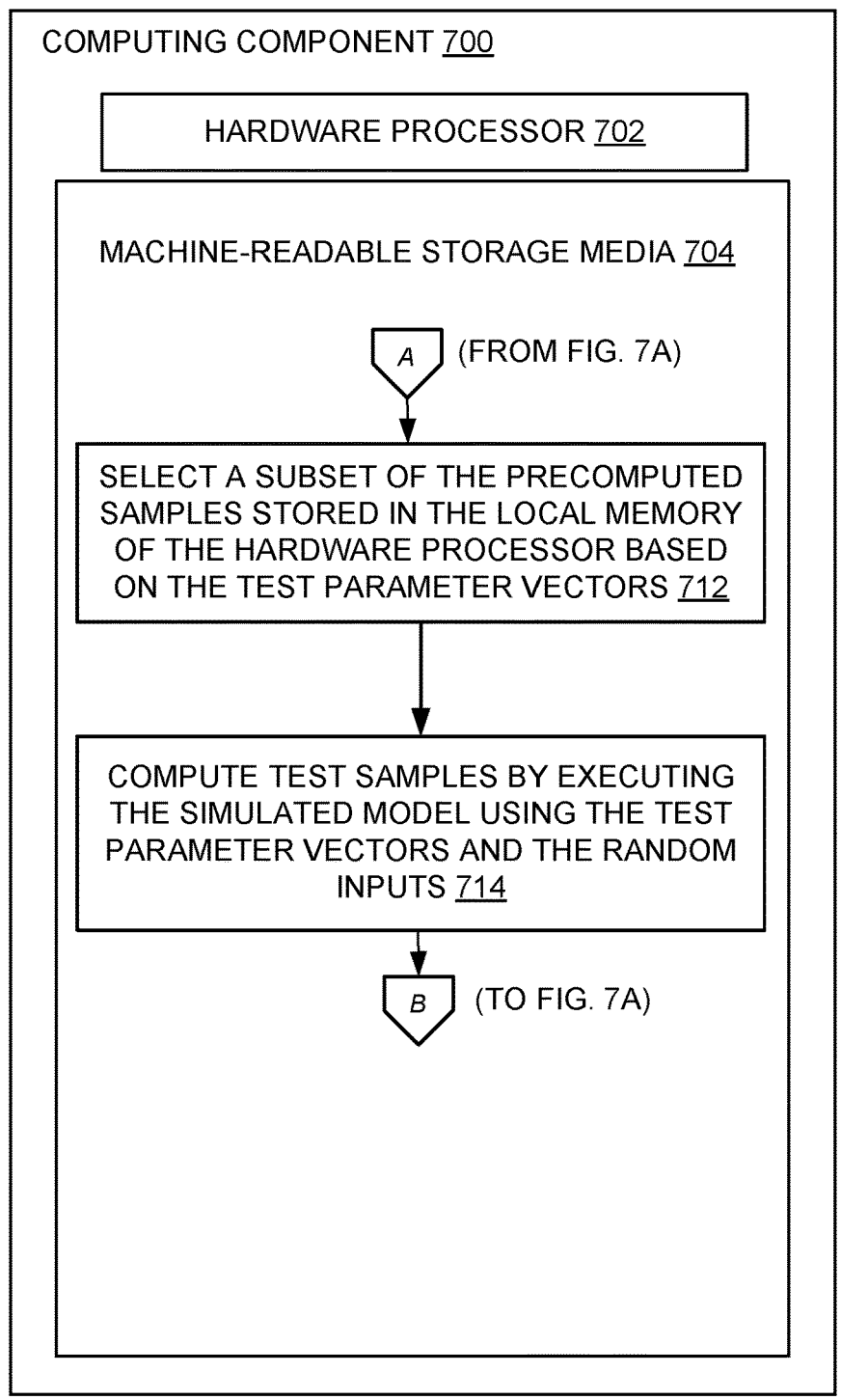
FIG. 7B is a block diagram of an example computing component for performing a second phase of a fast simulation using test parameter vectors as inputs according to one embodiment.

FIG. 7B is a block diagram of the example computing component 700 for performing a second phase of a fast simulation using test parameter vectors as inputs according to one embodiment. This second phase is performed independently for each hardware processor 602. Note this cannot be done in the conventional simulation system 600 of FIG. 6 because that system 600 has only a single processor 602.

Hardware processor 702 may execute instruction 712 to select a subset of the precomputed samples stored in the local memory 606 of the hardware processor 602 based on the test parameter vectors. For example, hardware processor 702 may perform a distance analysis between the test parameter vectors and the predetermined parameter vectors, as described above, to select the subset.

Hardware processor 702 may execute instruction 714 to compute test samples by executing the simulated model using the test parameter vectors and the random inputs. These test samples are stored in the local memory 606 as simulation path v{p} for processor p.

At this point processing enters the third and final phase, which is performed collectively for all of the processors 606 and is described with reference to FIG. 7A. Referring to FIG. 7A, hardware processors 702 may execute instruction 716 to combine the subset of the precomputed samples and the test samples to produce a simulation result. For example, hardware processors 606 may determine a difference between the precomputed samples and the test samples, as described above. At this point the simulation is complete.

Now an example fast simulation is described for financial data. European call option pricing is used to illustrate the technology described above. While the pricing of European options is often straightforward, it illustrates major rate-distortion theory techniques that are used in pricing other financial products and estimating financial risk.

A European call option is a financial derivative whose value is given by $$\max(S(T)-K, 0) \quad (13)$$

where S(T) is the price of the underlying asset (e.g., stock) at some future (maturity) time T, and K is a pre-determined strike price. Unless the value of the underlying asset at time T exceeds K, the product has no value.

In a conventional Monte Carlo simulation, one generates many samples of S(T) (for instance, through the use of a path generation formula), and estimates the price as $$X = \beta(u) = \frac{1}{n}\sum_{i=1}^{n} h(u_i) = \frac{1}{n}\sum_{i=1}^{n} \max(S_i(T) - K, 0) \quad (14)$$

where, as noted in the previous sub-section, one can always select n and T such that the statistical accuracy (e.g., error variance) of X is at least as good as that of the desired output X.

The availability of large-memory systems is used to speed up the simulations. Large amounts of statistics are precomputed offline and stored in memory. During the simulation, the relevant subset of the stored statistics is retrieved from the memory, and a small number of operations are applied to the retrieved statistics in lieu of performing the O(npT) number of operations described above.

The described solution is based on information theory, in particular rate-distortion theory, a branch of applied mathematics. The rate-distortion theory focuses on representing a signal X with less than R bits so that X can be sent through a capacity-constrained communications channel. The rate-distortion theory develops the concepts to design senders and receivers so that (i) the representation, $\tilde{X}$, of X can be described in less than R bits, and that (ii) the receiver recovers a good approximation of the original X, i.e., $\tilde{X}$ is close to X.

This solution appears to be the first one that utilizes large memory to speed up simulations such as Monte Carlo simulations, as well as utilizing concepts and methods from information theory towards this end. Next, analogies are drawn between Monte Carlo simulations and the rate-distortion theory to provide the framework for this solution.

In the following discussion, let R denote the capacity constraint (i.e., the memory size), X denote the desired simulation output with some pre-determined statistical accuracy, $\tilde{X}$ denote the approximation to the desired output, $\beta$ denote the deterministic function that maps the X values to the simulation output, $\alpha$ denote the deterministic function that maps X into its R-bit representation $\tilde{X}$, and n denote the number of simulations performed by the receiver (i.e., the processor executing the Monte Carlo simulations). The representation should be designed such that $\alpha(X)$ is less than R (i.e., memory size) for any X, and the function $\beta$ should be designed such that $\tilde{X}$ is a good approximation to X. The approximation can be, for instance, in Euclidean sense. The rate-distortion theory provides the methods to design the desired $\alpha$ and $\beta$.

Consider performing Monte Carlo simulations without the use of large memory. This would be analogous to a channel with R=0 capacity. In this case, the "receiver" (i.e., the processor) performs Monte Carlo simulations as described above to estimate the price of a financial product as $$\tilde{X} = \beta(u) = \frac{1}{n}\sum_{i=1}^{n} h(u_i) \quad (15)$$

Notice that one can make $\tilde{X}=X$ in the statistical accuracy sense, simply by increasing n and L, where L is the length of the set of samples. Thus, as long as one selects large enough values of n and L, the desired simulation output is achieved, of course, at the expense of computational cost.

Now, consider the availability of a large-memory architecture with R amount of memory. The receiver can still perform Monte Carlo simulations, however, it also receives information from the "sender" (i.e., the memory) with which it can supplement its simulations. In this case, $$\tilde{X} = \beta(u, \alpha(X)) = \mu\left(\alpha(X), \frac{1}{m}\sum_{i=1}^{m} h(u_i \mid \alpha(X_i))\right) \quad (16)$$

where the function μ reconstructs X by taking into account the received information α(X) from the memory, and supplementing it with a small (m<<n) number of Monte Carlo simulations, where the m simulations are also conditional on the information α(X)

As R becomes large, the quality of the information from the sender becomes better. Depending on the amount of R available, this supplementary information can be even good enough so that α(X)=X, in which case, m=0, i.e., the receiver does not need to perform any additional simulations to approximate X.

This leads to a four-stage process built on elements of information theory and statistical learning.

(i) Building an in-memory repository of simulated paths of an underlying model. This corresponds to X in Equation 16.

(ii) Generating a small number of paths during the online stage in response to an estimation request. This request can be the pricing of an option, a risk estimation, or the calculation of sensitivities. This corresponds to u in Equation 16.

(iii) Matching the estimation request to the statistics stored in the repository. This corresponds to α(X) in Equation 16.

(iv) Combining the matched and retrieved statistics (steps i and iii) with the paths generated in the online stage (step ii) to provide an estimate.

The first step is the offline stage, and the remaining three steps constitute the online stage.

Now, we consider our solution where there exists statistics stored in memory, and one supplements the Monte Carlo simulation with the stored statistics. In particular, consider pricing a European barrier option, with no-payoffs if the option exceeds a threshold between the days 490 and 510, a maturity of 5 years, simulated with 100,000 paths, and following a Heston model with $$s(t+1) = s(t)\exp\left(\mu - \frac{1}{2}v(t)\right)\Delta t + \sqrt{v(t)}\sqrt{\Delta t}\Delta W^s(t+1) \quad (17)$$

$$v(t+1) = v(t) + k(\theta - v(t))\Delta t + \varepsilon\sqrt{v(t)}\Delta W^v(t+1)$$

Assume that the parameter set for the model varies by 50 percent between [1.577, 0.0398, 0.5751, −0.5299, 0.0175] and [2.36550, 0.05970, 0.86265, −0.79485, 0.02625]. These five parameter vectors refer to the mean reversion, long-term variance, volatility of volatility, price-variance dependency, and initial variance, respectively. In this case, the steps are as follows.

(i) Building an in-memory repository of simulated paths of an underlying model. We generate offline and store 3125 sets of paths, with each set corresponding to one parameter vector. The number of paths is determined based on the amount of available memory. For this example, we assume that we have 1 TB of memory available to perform computations for both pricing and the sensitivity analysis (i.e., the Greeks). For each set, we store 100,000 paths, and for each path, we store 340 time steps. The time steps are selected to ensure that, when combined with the online paths generated in step (ii), the estimate has high accuracy given the memory limit of 1 TB. We assume each parameter varies by up to 50 percent, between [1.577, 0.0398, 0.5751, −0.5299, 0.0175] and [2.36550, 0.05970, 0.86265, −0.79485, 0.02625]. For instance, one path (this is a path corresponding to the parameter set [1.78201, 0.054924, 0.649863, −0.794850, 0.019775]) would have time steps at
{1,2,3,4,5,10,27,51,64,83,91,119,124,154,177,219,271, 321,365,392,423,440,475,5 27,533,589,817,825,831,856, 857,861,911,927,934,1006,1025,1031,1260}

These time steps are selected to address that the overall path trajectory can be statistically reconstructed as accurately as possible since they are distributed over the entire time frame as opposed to, for instance, being concentrated in one particular region of the time frame.

(ii) Generating a small number of paths during the online stage in response to an estimation request. This request can be the pricing of an option, a risk estimation, or the calculation of sensitivities. Suppose the requested parameter set during the online stage is [1.6, 0.04, 0.59, −0.54, 0.019]. A set of 100 paths are generated, each with 1260 time steps (corresponding to 5 years) following the Heston model with the requested parameter set [1.6, 0.04, 0.59, −0.54, 0.019]. The number of paths (100 in this case) is determined based on the online latency targets. A smaller/larger number of paths could have been selected at the expense of accuracy/latency.

(iii) Mapping the estimation request to the statistics stored in the repository. The mapped parameter sets from the repository built in step (i) are the following: [1.57700, 0.039800, 0.575100, −0.529900, 0.019775], [1.57700, 0.039800, 0.575100, −0.529900, 0.017500], [1.57700, 0.039800, 0.649863, −0.529900, 0.019775], [1.57700, 0.039800, 0.575100, −0.598787, 0.019775], [1.78201, 0.039800, 0.575100, −0.529900, 0.019775], [1.57700, 0.039800, 0.649863, −0.529900, 0.017500], [1.57700, 0.044974, 0.575100, −0.529900, 0.019775]. In this simple example, the mapped set are the parameter vectors with the closest Euclidean distance to those in the repository.

(iv) Combining the mapped statistics (steps i and iii) with the paths generated in the online stage (step ii) to provide an estimate. In this case, the outcome mapping would be $$S = \sum_{i \in P} w_i f(t, s_i) \quad (18)$$

where P is the set selected in step (iii), each index i corresponds to one of the parameter sets in (iii), s are the stored path values, and t are the generated path values in step (ii). In this case, the weights w are [9.185753, 6.653679, 5.346245, 4.981473, 4.768833, 4.376833, 4.370362], respectively, for the parameter sets [1.57700, 0.039800, 0.575100, −0.529900, 0.019775], [1.57700, 0.039800, 0.575100, −0.529900, 0.017500], [1.57700, 0.039800, 0.649863, −0.529900, 0.019775], [1.57700, 0.039800, 0.575100, −0.598787, 0.019775], [1.78201, 0.039800, 0.575100, −0.529900, 0.019775], [1.57700, 0.039800, 0.649863, −0.529900, 0.017500], [1.57700, 0.044974, 0.575100, −0.529900, 0.019775]. The weights are based on the Euclidean distances of the parameter vectors from the requested parameter set. Further, in this example, the function $f$ can be set as the average of two quantities: Weighted average of the matched and retrieved path prices, and the difference between the offline and online generated prices.

Figure 8:
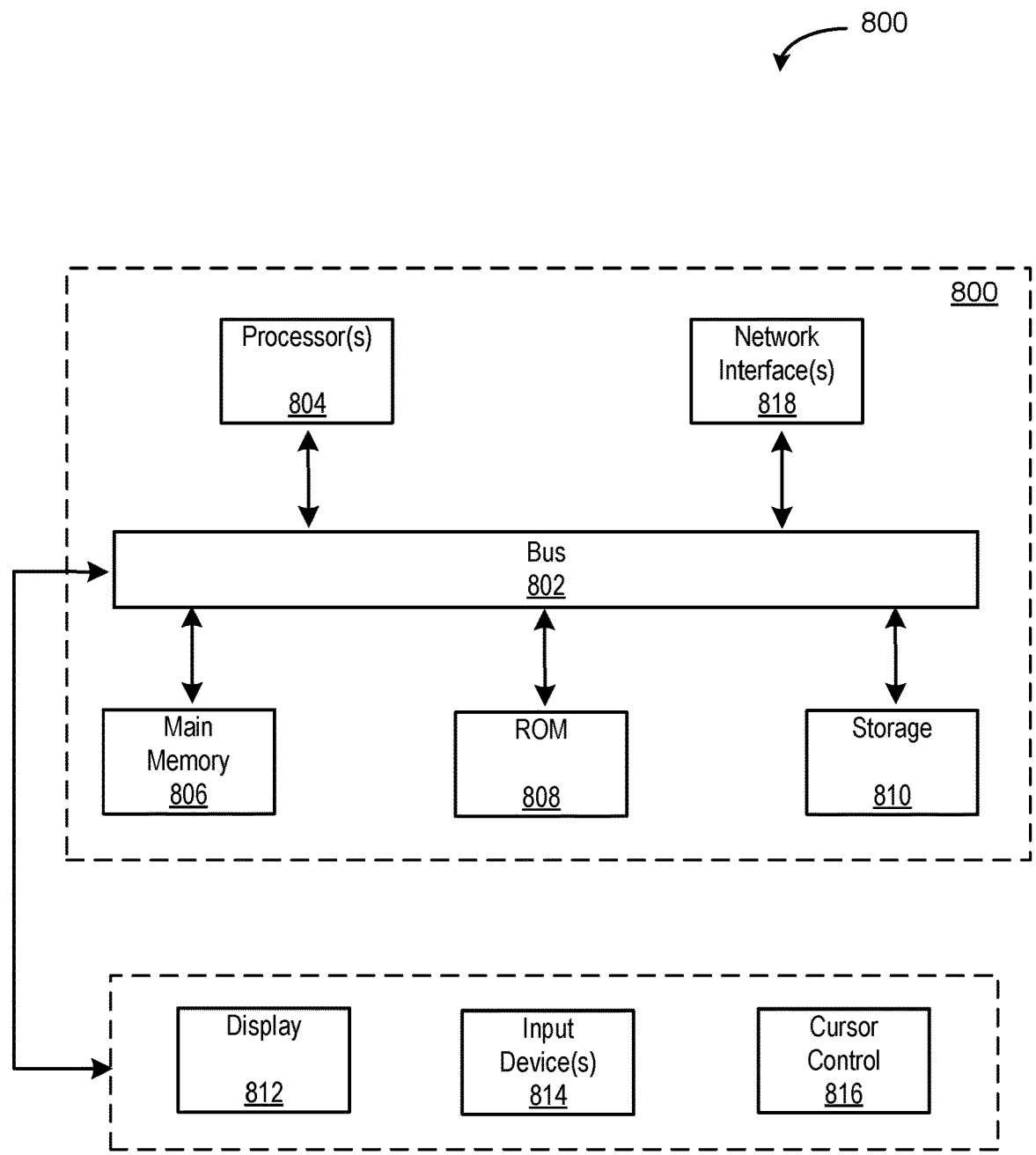
FIG. 8 depicts a block diagram of an example computer system 900 in which various of the embodiments described herein may be implemented.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameter vectors.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Network interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A method for performing a fast simulation using test parameter vectors as inputs, the method comprising:
    retrieving precomputed samples from a sample repository stored in a non-volatile memory, the precomputed samples being precomputed using a simulated model, predetermined parameter vectors, and random inputs;
    storing respective subsets of the precomputed samples in local memories of a plurality of respective hardware processors;
    storing the test parameter vectors in the local memories of the hardware processors;
    at each of the hardware processors,
        selecting a subset of the precomputed samples stored in the local memory of the hardware processor based on the test parameter vectors, and
        computing test samples by executing the simulated model using the test parameter vectors and the random inputs used to precompute the precomputed samples retrieved from the sample repository; and
    combining the subset of the precomputed samples and the test samples to produce a simulation result.

2. The method of claim 1, wherein the precomputed samples are computed prior to the storing of the test parameter vectors.

3. The method of claim 1, wherein each of the respective subsets of the precomputed samples comprises a respective group of simulation paths.

4. The method of claim 1, wherein selecting the subset of the precomputed samples stored in the local memory of the hardware processor based on the test parameter vectors comprises:
    performing a distance analysis between the test parameter vectors and the predetermined parameter vectors.

5. The method of claim 1, wherein the simulation result represents at least one of:
   prices of financial products; and
   financial risks associated with the financial products.

6. The method of claim 1, wherein the size of the sample repository corresponds to a capacity of the local memories.

7. The method of claim 1, wherein the fast simulation represents a Monte Carlo simulation.

8. A non-transitory machine-readable storage medium encoded with instructions executable by a plurality of hardware processors of a computing component to perform a fast simulation using test parameter vectors as inputs, the machine-readable storage medium comprising instructions to cause the hardware processors to:
   retrieve precomputed samples from a sample repository stored in a non-volatile memory, the precomputed samples being precomputed using a simulated model, predetermined parameter vectors, and random inputs;
   store respective subsets of the precomputed samples in local memories of respective ones of the hardware processors;
   store the test parameter vectors in the local memories of the hardware processors;
   at each of the hardware processors,
      select a subset of the precomputed samples stored in the local memory of the hardware processor based on the test parameter vectors, and
      compute test samples by executing the simulated model using the test parameter vectors and the random inputs used to precompute the precomputed samples retrieved from the sample repository; and
      combine the subset of the precomputed samples and the test samples to produce a simulation result.

9. The non-transitory machine-readable storage medium of claim 8, wherein
   the precomputed samples are computed prior to storing the test parameter vectors.

10. The non-transitory machine-readable storage medium of claim 8, wherein each of the respective subsets of the precomputed samples comprises a respective group of simulation paths.

11. The non-transitory machine-readable storage medium of claim 8, wherein the instructions further cause the hardware processors to:
   perform a distance analysis between the test parameter vectors and the predetermined parameter vectors.

12. The non-transitory machine-readable storage medium of claim 8, wherein the simulation result represents at least one of:
   prices of financial products; and
   financial risks associated with the financial products.

13. The non-transitory machine-readable storage medium of claim 8, wherein the size of the sample repository corresponds to a capacity of the local memories.

14. The non-transitory machine-readable storage medium of claim 8, wherein the fast simulation represents a Monte Carlo simulation.

15. A system comprising:
   a plurality of hardware processors; and
   a non-transitory machine-readable storage medium encoded with instructions executable by the hardware processors to:
   retrieve precomputed samples from a sample repository stored in a non-volatile memory, the precomputed samples being precomputed using a simulated model, predetermined parameter vectors, and random inputs;
   store respective subsets of the precomputed samples in local memories of respective ones of the hardware processors;
   store the test parameter vectors in the local memories of the hardware processors;
   at each of the hardware processors,
      select a subset of the precomputed samples stored in the local memory of the hardware processor based on the test parameter vectors, and
      compute test samples by executing the simulated model using the test parameter vectors and the random inputs used to precompute the precomputed samples retrieved from the sample repository; and
   combine the subset of the precomputed samples and the test samples to produce a simulation result.

16. The system of claim 15, wherein:
   the precomputed samples are computed prior to storing the test parameter vectors.

17. The system of claim 15, wherein:
   each of the respective subsets of the precomputed samples comprises a respective group of simulation paths.

18. The system of claim 15, wherein the instructions further cause the hardware processors to:
   perform a distance analysis between the test parameter vectors and the predetermined parameter vectors.

19. The system of claim 15, wherein the simulation result represents at least one of:
   prices of financial products; and
   financial risks associated with the financial products.

20. The system of claim 15, wherein the size of the sample repository corresponds to a capacity of the local memories.

21. The system of claim 15, wherein the fast simulation represents a Monte Carlo simulation.

* * * * *